United States Patent
Eischeid et al.

(10) Patent No.: US 10,120,958 B1
(45) Date of Patent: *Nov. 6, 2018

(54) AUTOMATIC DISAMBIGUATION ASSISTANCE FOR SIMILAR ITEMS IN A SET

(71) Applicant: ALLSCRIPTS SOFTWARE, LLC, Chicago, IL (US)

(72) Inventors: Todd Michael Eischeid, Cary, NC (US); Mary S. Johnson, Raleigh, NC (US)

(73) Assignee: ALLSCRIPTS SOFTWARE, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/396,451

(22) Filed: Dec. 31, 2016

Related U.S. Application Data

(63) Continuation of application No. 15/261,991, filed on Sep. 11, 2016, which is a continuation of application No. 14/069,334, filed on Oct. 31, 2013, now Pat. No. 9,443,015.

(51) Int. Cl.
  *G06F 17/30* (2006.01)
  *G06Q 10/02* (2012.01)
  *G06Q 30/02* (2012.01)

(52) U.S. Cl.
  CPC .. *G06F 17/30991* (2013.01); *G06F 17/30696* (2013.01); *G06F 17/30864* (2013.01); *G06F 17/30867* (2013.01); *G06F 17/30985* (2013.01); *G06Q 30/02* (2013.01)

(58) Field of Classification Search
  CPC ......... G06F 17/30864; G06F 17/30867; G06F 17/30675; G06F 17/30696; G06Q 30/02
  USPC ...................................................... 707/723
  See application file for complete search history.

(56) References Cited

U.S. PATENT DOCUMENTS

| | | | |
|---|---|---|---|
| 2005/0075902 A1* | 4/2005 | Wager ................... | G06Q 10/10 705/2 |
| 2010/0005079 A1* | 1/2010 | Bayliss ............. | G06F 17/30303 707/E17.014 |
| 2010/0169340 A1* | 7/2010 | Kenedy .............. | G06Q 30/0631 707/758 |
| 2010/0169342 A1* | 7/2010 | Kenedy ............. | G06F 17/30867 707/758 |
| 2010/0169343 A1* | 7/2010 | Kenedy ............. | G06F 17/30867 707/758 |

(Continued)

*Primary Examiner* — Pierre M Vital
*Assistant Examiner* — Andrew N Ho
(74) *Attorney, Agent, or Firm* — Loza & Loza, LLP; Peter Zura

(57) ABSTRACT

A method includes calculating, for each unique pair of search results of a plurality of search results, a first similarity value; automatically determining that the determined first similarity value for one or more of the unique pairs exceeds a similarity value threshold; iterating through similarity value calculations, until a similarity value is recalculated for each of the one or more unique pairs for which the first similarity value exceeded the similarity value threshold; and displaying the plurality of search results, each search result including display of data corresponding to default fields, and data corresponding to any looked up field that was necessary to cause a recalculated similarity value to fall below a threshold similarity value for any unique pair that search result belongs to.

20 Claims, 43 Drawing Sheets

(56) References Cited

U.S. PATENT DOCUMENTS

2010/0169348 A1\* 7/2010 Maro ................ G06F 17/30489
707/758

\* cited by examiner

FIG. 2

FRANK BLACK

Search

Smith, Sa

| Smith, Sally A. (Ms.) Age: 31 |
| Smith, Sally A. (Mrs.) Age: 64 |
| Smith, Sam P. |
| Smith, Sandra C. Age: 12 |
| Smith, Sandra F. Age: 59 |
| Smith, Sasha J. |

Frank Black's To Do List

- Take Blood Pressure
- Call Ms. Floyd
  Gertrude Floyd

*FIG. 3A*

FIG. 3B s1 = Similarity ( first name : first name )
s2 = Similarity ( last name : last name )
s3 = Similarity ( middle initial : middle initial )

$$\text{Similarity Value} = \frac{s1 + s2 + s3}{3}$$

FIG. 4

Similarity Value Calculation for result 1 "Sally A. Smith" and result 2 "Sally A. Smith"

s1 = Similarity ( Sally : Sally ) = 1
s2 = Similarity ( Smith : Smith ) = 1
s3 = Similarity ( A. : A. ) = 1

$$\text{Similarity Value} = \frac{1+1+1}{3} = 1.000$$

*FIG. 5*

Similarity Value Calculation for result 1 "Sally A. Smith" and result 3 "Sam P. Smith"

s1 = Similarity ( Sally  : Sam   ) = 0
s2 = Similarity ( Smith  : Smith ) = 1
s3 = Similarity ( A.     : P.    ) = 0

$$\text{Similarity Value} = \frac{0 + 1 + 0}{3} = 0.333$$

FIG. 6

Similarity Value Calculation for result 4 "Sandra C. Smith" and result 5 "Sandra F. Smith"

s1 = Similarity ( Sandra : Sandra ) = 1
s2 = Similarity ( Smith : Smith ) = 1
s3 = Similarity ( C. : F. ) = 0

$$\text{Similarity Value} = \frac{1 + 1 + 0}{3} = 0.666$$

FIG. 7

|          | Result 1 | Result 2 | Result 3 | Result 4 | Result 5 | Result 6 |
|----------|----------|----------|----------|----------|----------|----------|
| Result 1 | 1.000    |          |          |          |          |          |
| Result 2 | 1.000    | 1.000    |          |          |          |          |
| Result 3 | 0.333    | 0.333    | 1.000    |          |          |          |
| Result 4 | 0.333    | 0.333    | 0.333    | 1.000    |          |          |
| Result 5 | 0.333    | 0.333    | 0.333    | 0.666    | 1.000    |          |
| Result 6 | 0.333    | 0.333    | 0.333    | 0.333    | 0.333    | 1.000    |

*FIG. 8A*

|          | Result 1 | Result 2 | Result 3 | Result 4 | Result 5 | Result 6 |
|----------|----------|----------|----------|----------|----------|----------|
| Result 1 | 1.000    |          |          |          |          |          |
| Result 2 | 1.000    | 1.000    |          |          |          |          |
| Result 3 | 0.333    | 0.333    | 1.000    |          |          |          |
| Result 4 | 0.333    | 0.333    | 0.333    | 1.000    |          |          |
| Result 5 | 0.333    | 0.333    | 0.333    | 0.666    | 1.000    |          |
| Result 6 | 0.333    | 0.333    | 0.333    | 0.333    | 0.333    | 1.000    |

*FIG. 8B*

FIG. 9 s1 = Similarity ( first name : first name )
s2 = Similarity ( last name : last name )
s3 = Similarity ( middle initial : middle initial )
s4 = Similarity ( age : age )

$$\text{Similarity Value} = \frac{s1 + s2 + s3 + s4}{4}$$

*FIG. 10*

Similarity Value Calculation for result 1 "Sally A. Smith" and result 2 "Sally A. Smith"

s1 = Similarity ( Sally : Sally ) = 1
s2 = Similarity ( Smith : Smith ) = 1
s3 = Similarity ( A. : A. ) = 1
s4 = Similarity ( 31 : 64 ) = 0

$$\text{Similarity Value} = \frac{1+1+1+0}{4} = 0.750$$

FIG. 11

Similarity Value Calculation for result 4 "Sandra C. Smith" and result 5 "Sandra F. Smith"

s1 = Similarity ( Sandra : Sandra ) = 1
s2 = Similarity ( Smith : Smith ) = 1
s3 = Similarity ( C. : F. ) = 0
s4 = Similarity ( 12 : 59 ) = 0

$$\text{Similarity Value} = \frac{1+1+0+0}{4} = 0.500$$

FIG. 12

|          | Result 1 | Result 2 | Result 3 | Result 4 | Result 5 | Result 6 |
|----------|----------|----------|----------|----------|----------|----------|
| Result 1 | 1.000    |          |          |          |          |          |
| Result 2 | 0.750    | 1.000    |          |          |          |          |
| Result 3 |          |          | 1.000    |          |          |          |
| Result 4 |          |          |          | 1.000    |          |          |
| Result 5 |          |          |          | 0.500    | 1.000    |          |
| Result 6 |          |          |          |          |          | 1.000    |

*FIG. 13A*

|  | Result 1 | Result 2 | Result 3 | Result 4 | Result 5 | Result 6 |
|---|---|---|---|---|---|---|
| Result 1 | 1.000 |  |  |  |  |  |
| Result 2 | 0.750 | 1.000 |  |  |  |  |
| Result 3 |  |  | 1.000 |  |  |  |
| Result 4 |  |  |  | 1.000 |  |  |
| Result 5 |  |  |  | 0.500 | 1.000 |  |
| Result 6 |  |  |  |  |  | 1.000 |

*FIG. 13B* s1 = Similarity( first name : first name )
s2 = Similarity( last name : last name )
s3 = Similarity( middle initial : middle initial )
s4 = Similarity( age : age )
s4 = Similarity( title : title )

$$\text{Similarity Value} = \frac{s1 + s2 + s3 + s4 + s5}{5}$$

*FIG. 14*

Similarity Value Calculation for result 1 "Sally A. Smith" and result 2 "Sally A. Smith"

s1 = Similarity ( Sally  : Sally  ) = 1
s2 = Similarity ( Smith  : Smith  ) = 1
s3 = Similarity ( A.     : A.     ) = 1
s4 = Similarity ( 31     : 64     ) = 0
s5 = Similarity ( Ms.    : Mrs.   ) = 0

$$\text{Similarity Value} = \frac{1+1+1+0+0}{5} = 0.600$$

FIG. 15

|          | Result 1 | Result 2 | Result 3 | Result 4 | Result 5 | Result 6 |
|----------|----------|----------|----------|----------|----------|----------|
| Result 1 | 1.000    |          |          |          |          |          |
| Result 2 | 0.600    | 1.000    |          |          |          |          |
| Result 3 |          |          | 1.000    |          |          |          |
| Result 4 |          |          |          | 1.000    |          |          |
| Result 5 |          |          |          |          | 1.000    |          |
| Result 6 |          |          |          |          |          | 1.000    |

*FIG. 16*

FIG. 17 s1 = Similarity( first name : first name )
s2 = Similarity( last name : last name )
s3 = Similarity( middle initial : middle initial )
s4 = Similarity( gender : gender )

$$\text{Similarity Value} = \frac{s1 + s2 + s3 + s4}{4}$$

FIG. 18

Similarity Value Calculation for result 1 "Sally A. Smith" and result 2 "Sally A. Smith"

s1 = Similarity ( Sally   : Sally  ) = 1
s2 = Similarity ( Smith   : Smith  ) = 1
s3 = Similarity ( A.      : A.     ) = 1
s4 = Similarity ( female  : female ) = 1

Similarity Value = $\dfrac{1+1+1+1}{4}$ = 1.000

FIG. 19

Similarity Value Calculation for result 4 "Sandra C. Smith" and result 5 "Sandra F. Smith"

s1 = Similarity( Sandra : Sandra ) = 1
s2 = Similarity( Smith : Smith ) = 1
s3 = Similarity( C. : F. ) = 0
s4 = Similarity( female : female ) = 1

$$\text{Similarity Value} = \frac{1+1+0+1}{4} = 0.750$$

FIG. 20

|  | Result 1 | Result 2 | Result 3 | Result 4 | Result 5 | Result 6 |
|---|---|---|---|---|---|---|
| Result 1 | 1.000 |  |  |  |  |  |
| Result 2 | 1.000 | 1.000 |  |  |  |  |
| Result 3 |  |  | 1.000 |  |  |  |
| Result 4 |  |  |  | 1.000 |  |  |
| Result 5 |  |  |  | 0.750 | 1.000 |  |
| Result 6 |  |  |  |  |  | 1.000 |

*FIG. 21* s1 = Similarity( first name : first name )
s2 = Similarity( last name : last name )
s3 = Similarity( middle initial : middle initial )
s4 = Similarity( gender : gender )
s5 = Similarity( age : age )

$$\text{Similarity Value} = \frac{s1 + s2 + s3 + s4 + s5}{5}$$

FIG. 22 s1 = Similarity( first name : first name )
s2 = Similarity( last name : last name )
s3 = Similarity( middle initial : middle initial )
s4 = Similarity( age : age )

$$\text{Similarity Value} = \frac{s1 + s2 + s3 + s4}{4}$$

Similarity Value Calculation for result 1 "Sally A. Smith" and result 2 "Sally A. Smith"

s1 = Similarity ( Sally : Sally ) = 1
s2 = Similarity ( Smith : Smith ) = 1
s3 = Similarity ( A. : A. ) = 1
s4 = Similarity ( Ms. : Mrs. ) = 0

Similarity Value = $\dfrac{1 + 1 + 1 + 0}{4}$ = 0.750

FIG. 26

Similarity Value Calculation for result 4 "Sandra C. Smith" and result 5 "Sandra F. Smith"

s1 = Similarity( Sandra : Sandra ) = 1
s2 = Similarity( Smith : Smith ) = 1
s3 = Similarity( C. : F. ) = 0
s4 = Similarity( Ms. : Ms. ) = 1

$$\text{Similarity Value} = \frac{1+1+0+1}{4} = 0.750$$

FIG. 27

|           | Result 1 | Result 2 | Result 3 | Result 4 | Result 5 | Result 6 |
|-----------|----------|----------|----------|----------|----------|----------|
| Result 1  | 1.000    |          |          |          |          |          |
| Result 2  | 0.750    | 1.000    |          |          |          |          |
| Result 3  |          |          | 1.000    |          |          |          |
| Result 4  |          |          |          | 1.000    |          |          |
| Result 5  |          |          |          | 0.750    | 1.000    |          |
| Result 6  |          |          |          |          |          | 1.000    |

*FIG. 28*

Similarity Value Calculation for result 1 "Sally A. Smith" and result 2 "Sally A. Smith"

s1 = Similarity( Sally : Sally ) = 1
s2 = Similarity( Smith : Smith ) = 1
s3 = Similarity( A. : A. ) = 1
s4 = Similarity( Ms. : Mrs. ) = 0
s5 = Similarity( 31 : 64 ) = 0

$$\text{Similarity Value} = \frac{1+1+1+0+0}{5} = 0.600$$

*FIG. 29*

Similarity Value Calculation for result 4 "Sandra C. Smith" and result 5 "Sandra F. Smith"

s1 = Similarity ( Sandra : Sandra ) = 1
s2 = Similarity ( Smith : Smith ) = 1
s3 = Similarity ( C. : F. ) = 0
s4 = Similarity ( Ms. : Ms. ) = 1
s5 = Similarity ( 12 : 59 ) = 0

$$\text{Similarity Value} = \frac{1+1+0+1+0}{5} = 0.600$$

Similarity Value Calculation for result 4 "Sandra C. Smith" and result 5 "Sandra F. Smith"

s1 = Similarity ( Sandra : Sandra ) = 1
s2 = Similarity ( Smith : Smith ) = 1
s3 = Similarity ( C. : F. ) = 0
s4 = Similarity ( 12 : 59 ) = 0

$$\text{Similarity Value} = \frac{1+1+0+0}{4} = 0.500$$

FIG. 32

$$\text{Similarity}(x:y) = 1 - \frac{|x-y|}{100}$$

FIG. 33 s1 = Similarity( first name : first name )
s2 = Similarity( last name : last name )
s3 = Similarity( middle initial : middle initial )
s4 = Similarity( age1 : age2 )

$$\text{Similarity}(\text{age1}:\text{age2}) = 1 - \frac{|\text{age1} - \text{age2}|}{100}$$

$$\text{Similarity Value} = \frac{s1 + s2 + s3 + s4}{4}$$

*FIG. 34*

Similarity Value Calculation for result 1 "Sally A. Smith" and result 2 "Sally A. Smith"

s1 = Similarity ( Sally : Sally ) = 1
s2 = Similarity ( Smith : Smith ) = 1
s3 = Similarity ( A. : A. ) = 1
s4 = Similarity ( 31 : 64 ) = 0.67

$$\text{Similarity ( age1 : age2 )} = 1 - \frac{|31 - 64|}{100} = 0.67$$

$$\text{Similarity Value} = \frac{1 + 1 + 1 + 0.67}{4} = 0.918$$

*FIG. 35*

Similarity Value Calculation for result 4 "Sandra C. Smith" and result 5 "Sandra F. Smith"

s1 = Similarity ( Sandra : Sandra ) = 1
s2 = Similarity ( Smith : Smith ) = 1
s3 = Similarity ( C. : F. ) = 0
s4 = Similarity ( 12 : 59 ) = 0.53

$$\text{Similarity ( age1 : age2 )} = 1 - \frac{|12 - 59|}{100} = 0.53$$

$$\text{Similarity Value} = \frac{1 + 1 + 0 + 0.53}{4} = 0.633$$

FIG. 36

|          | Result 1 | Result 2 | Result 3 | Result 4 | Result 5 | Result 6 |
|----------|----------|----------|----------|----------|----------|----------|
| Result 1 | 1.000    |          |          |          |          |          |
| Result 2 | 0.918    | 1.000    |          |          |          |          |
| Result 3 |          |          | 1.000    |          |          |          |
| Result 4 |          |          |          | 1.000    |          |          |
| Result 5 |          |          |          | 0.633    | 1.000    |          |
| Result 6 |          |          |          |          |          | 1.000    |

*FIG. 37*

FIG. 38 s1 = Similarity ( first name : first name )
s2 = Similarity ( last name : last name )
s3 = Similarity ( middle initial : middle initial )
s4 = Similarity ( title : title )

w1 = Weight (first name)
w2 = Weight (last name)
w3 = Weight (middle initial)
w4 = Weight (title)

$$\text{Similarity Value} = \frac{s1*w1 + s2*w2 + s3*w3 + s4*w4}{w1 + w2 + w3 + w4}$$

*FIG. 39* s1 = Similarity ( Sally : Sally ) = 1
s2 = Similarity ( Smith : Smith ) = 1
s3 = Similarity ( A. : A. ) = 1
s4 = Similarity ( Ms. : Mrs. ) = 0 w1 = Weight (first name) = 2
w2 = Weight (last name) = 2
w3 = Weight (middle initial) = 1
w4 = Weight (title) = 1

$$\text{Similarity Value} = \frac{s1^*w1 + s2^*w2 + s3^*w3 + s4^*w4}{w1 + w2 + w3 + w4} = \frac{1^*2 + 1^*2 + 1^*1 + 1^*0}{2 + 2 + 1 + 1} = 0.833$$

*FIG. 40*

AUTOMATIC DISAMBIGUATION ASSISTANCE FOR SIMILAR ITEMS IN A SET

CROSS-REFERENCE TO RELATED APPLICATION

The present application is a U.S. continuation patent application of, and claims priority under 35 U.S.C. § 120 to, U.S. nonprovisional patent application Ser. No. 15/261,991, which '991 application is a U.S. continuation patent application of, and claims priority under 35 U.S.C. § 120 to, U.S. nonprovisional patent application Ser. No. 14/069,334, filed Oct. 31, 2013, now U.S. Pat. No. 9,443,015, incorporated herein by reference.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to methodologies for displaying search results.

When searching a large domain of information such as a medical patient database, often a user is searching for a particular patient. This represents a different scenario than a web search, where a user is often not searching for a particular web page.

For example, in a traditional search flow in the health care space, a user might initiate a patient search by inputting a name, a birthdate, or a patient identifier. In response, a system might display search results comprising a list of patients. FIG. 1 illustrates an exemplary display of such search results in response to a user, looking to search for "Sally Smith", inputting a search string of "Smith, Sa". Sometimes, displayed search results will include display of additional information about each patient, but will generally not show all patient information for each patient in order to keep the result list readable by the user.

If the user enters a first and last name, and the search domain is very large, then a large number of search results could be returned with many appearing very similar to one another in terms of the displayed information. For example, if the user is looking for Sally Smith, and the system contains 34 Sally Smiths, then many of those search results could be visually very similar and the user may not see enough distinguishing information across the search results in order to pick out the Sally Smith that they are interested in, as illustrated in FIG. 1. A need exists for improvement in methodologies for displaying search results. This need and other needs are addressed by one or more aspects of the present invention.

SUMMARY OF THE INVENTION

The present invention includes many aspects and features. Moreover, while many aspects and features relate to, and are described in, the context of electronic medical records, the present invention is not limited to use only in this context, as will become apparent from the following summaries and detailed descriptions of aspects, features, and one or more embodiments of the present invention.

Accordingly, one aspect of the present invention relates to a method comprising receiving, via one or more input devices associated with an electronic device, input corresponding to a search string for a search query; retrieving, based on the search string for the search query, a plurality of search results; automatically determining, based on configuration settings, one or more default fields for the search results to be displayed in connection with the search query; automatically calculating, for each unique pair of search results of the plurality of search results, a first similarity value; automatically determining that the determined first similarity value for one or more of the unique pairs exceeds a similarity value threshold; iterating through similarity value calculations, until a similarity value is recalculated for each of the one or more unique pairs for which the first similarity value exceeded the similarity value threshold, by repeatedly looking up, in configuration settings, a next field to utilize in similarity calculations, automatically recalculating, based in part on the looked up next field, for the one or more of the unique pairs for which the last calculated similarity value was determined to exceed the similarity value threshold, a new similarity value, determining whether the most recently recalculated similarity value, for each of the one or more of the unique pairs for which the last calculated similarity value was determined to exceed the similarity value threshold, exceeds the similarity value threshold; upon determining that a similarity value has been recalculated for each of the one or more unique pairs for which the first similarity value exceeded the similarity value threshold; and displaying, via a display associated with the electronic device, the plurality of search results, each search result including display of data corresponding to the default fields, and data corresponding to any looked up field that was necessary to cause a recalculated similarity value to fall below a threshold similarity value for any unique pair that search result belongs to, wherein, with the exception of the default fields, each displayed search result does not include display of extraneous data corresponding to fields that were not necessary to cause a recalculated similarity value to fall below a threshold similarity value for a unique pair that search result belongs to.

In a feature of this aspect, the electronic device comprises a tablet.

In a feature of this aspect, the electronic device comprises a phone.

In a feature of this aspect, the electronic device comprises a laptop.

In a feature of this aspect, the electronic device comprises a desktop computer.

In a feature of this aspect, the one or more input devices comprise a mouse.

In a feature of this aspect, the one or more input devices comprise a touchpad.

In a feature of this aspect, the one or more input devices comprise a keyboard.

In a feature of this aspect, the one or more input devices comprise a trackball.

In a feature of this aspect, the one or more input devices comprise a camera.

In a feature of this aspect, the one or more input devices comprise a touchscreen.

In a feature of this aspect, the display comprises a touchscreen.

In a feature of this aspect, the display comprises a monitor.

In a feature of this aspect, the display comprises a keyboard.

Another aspect relates to a method comprising receiving, via one or more input devices associated with an electronic device, input corresponding to a search string for a search query; retrieving, based on the search string for the search query, a plurality of search results; automatically determining, based on configuration settings, one or more default fields for the search results to be displayed in connection with the search query; automatically calculating, for each unique pair of search results of the plurality of search results, a first similarity value; automatically determining that the determined first similarity value for one or more of the unique pairs exceeds a similarity value threshold; iterating through similarity value calculations, until a similarity value is recalculated for each of the one or more unique pairs for which the first similarity value exceeded the similarity value threshold, by repeatedly looking up, in configuration settings, a next field to utilize in similarity calculations, automatically recalculating, based in part on the looked up next field, for the one or more of the unique pairs for which the last calculated similarity value was determined to exceed the similarity value threshold, a new similarity value, determining whether the most recently recalculated similarity value, for each of the one or more of the unique pairs for which the last calculated similarity value was determined to exceed the similarity value threshold, exceeds the similarity value threshold; upon determining that a similarity value has been recalculated for each of the one or more unique pairs for which the first similarity value exceeded the similarity value threshold; and displaying, via a display associated with the electronic device, the plurality of search results, each search result including display of data corresponding to the default fields, and data corresponding to any looked up field that was utilized to cause a recalculated similarity value to fall below a threshold similarity value for any unique pair that search result belongs to, wherein, with the exception of the default fields, each displayed search result does not include display of extraneous data corresponding to fields that were not utilized to cause a recalculated similarity value to fall below a threshold similarity value for a unique pair that search result belongs to.

Another aspect relates to a method comprising receiving, via one or more input devices associated with an electronic device, input corresponding to a search string for a search query; retrieving, based on the search string for the search query, a plurality of search results; automatically determining, based on configuration settings, one or more default fields for the search results to be displayed in connection with the search query; automatically calculating, for each unique pair of search results of the plurality of search results, a first similarity value; automatically determining that the determined first similarity value for one or more of the unique pairs exceeds a similarity value threshold; iterating through similarity value calculations, until a similarity value is recalculated for each of the one or more unique pairs for which the first similarity value exceeded the similarity value threshold, by repeatedly looking up, in configuration settings, a next field to utilize in similarity calculations, automatically recalculating, based in part on the looked up next field, for the one or more of the unique pairs for which the last calculated similarity value was determined to exceed the similarity value threshold, a new similarity value, determining whether the most recently recalculated similarity value, for each of the one or more of the unique pairs for which the last calculated similarity value was determined to exceed the similarity value threshold, exceeds the similarity value threshold; upon determining that a similarity value has been recalculated for each of the one or more unique pairs for which the first similarity value exceeded the similarity value threshold; and displaying, via a display associated with the electronic device, the plurality of search results, each search result including display of a value for that search result corresponding to the default fields, and a value for that search result corresponding to any looked up field that was required to cause a recalculated similarity value to fall below a threshold similarity value for any unique pair, wherein, with the exception of the default fields, each displayed search result does not include display of extraneous data corresponding to fields that were not required to cause a recalculated similarity value to fall below a threshold similarity value for any unique pair.

Another aspect relates to receiving, via one or more input devices associated with an electronic device, input corresponding to a search string for a search query; retrieving, based on the search string for the search query, a plurality of search results; automatically determining, based on configuration settings, one or more default fields for the search results to be displayed in connection with the search query; automatically calculating, for each unique pair of search results of the plurality of search results, a first similarity value; automatically determining that the determined first similarity value for one or more of the unique pairs exceeds a similarity value threshold; iterating through similarity value calculations, until a similarity value is recalculated for each of the one or more unique pairs for which the first similarity value exceeded the similarity value threshold, by repeatedly looking up, in configuration settings, a next field to utilize in similarity calculations, automatically recalculating, based in part on the looked up next field, for the one or more of the unique pairs for which the last calculated similarity value was determined to exceed the similarity value threshold, a new similarity value, determining whether the most recently recalculated similarity value, for each of the one or more of the unique pairs for which the last calculated similarity value was determined to exceed the similarity value threshold, exceeds the similarity value threshold; upon determining that a similarity value has been recalculated for each of the one or more unique pairs for which the first similarity value exceeded the similarity value threshold; and displaying, via a display associated with the electronic device, the plurality of search results, each search result including display of a value for that search result corresponding to the default fields, and a value for that search result corresponding to any looked up field that was utilized to cause a recalculated similarity value to fall below a threshold similarity value for any unique pair, wherein, with the exception of the default fields, each displayed search result does not include display of extraneous data corresponding to fields that were not utilized to cause a recalculated similarity value to fall below a threshold similarity value for any unique pair.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein:

FIG. 2 illustrates the display of data corresponding to additional data fields as compared to the interface of FIG. 1;

FIG. 3A illustrates the display of search results in accordance with one or more preferred implementations, where a system has determined that there is a degree of similarity between two patients named "Sally A. Smith", and so displays additional data corresponding to these patients;

FIG. 3B illustrates the display of search results similar to that of FIG. 3A, except that data corresponding to the same data fields are displayed for all results;

FIG. 4 illustrates an exemplary methodology for calculating a similarity value;

FIG. 5 illustrates calculation of a similarity value corresponding to similarity between first and second search results;

FIG. 6 illustrates calculation of a similarity value corresponding to similarity between first and third search results;

FIG. 7 illustrates calculation of a similarity value corresponding to similarity between fourth and fifth search results;

FIG. 8A illustrates a similarity matrix;

FIG. 8B illustrates the similarity matrix of FIG. 8A, with highlighting (via underlining) for each of the similarity values in the similarity matrix which exceeds a threshold similarity value of "0.650";

FIG. 9 illustrates an exemplary user interface for allowing a user to modify an order for fields to potentially utilize for display;

FIG. 10 illustrates calculation of a similarity value utilizing an age field in addition to first name, last name, and middle initial fields;

FIG. 11 illustrates specific calculation of a similarity value of "0.750" for first and second results which were previously determined to be similar;

FIG. 12 illustrates specific calculation of a similarity value for fourth and fifth results which were previously determined to be similar;

FIG. 13A illustrates a similarity matrix populated based on calculations in accordance with FIG. 10;

FIG. 13B illustrates the similarity matrix of FIG. 13A with similarity values exceeding a threshold value of "0.650" highlighted;

FIG. 14 illustrates calculation of a similarity value utilizing a title field in addition to first name, last name, middle initial, and age fields;

FIG. 15 illustrates specific calculation of a similarity value of "0.600" for first and second results which were previously determined to be similar;

FIG. 16 illustrates a similarity matrix populated based on calculations in accordance with FIG. 14;

FIG. 17 illustrates a change in an order of field priority that places a gender field ahead of an age field;

FIG. 18 illustrates calculation of a similarity value utilizing a gender field in addition to first name, last name, and middle initial fields;

FIG. 19 illustrates specific calculation of a similarity value of "1.000" for first and second results which were previously determined to be similar;

FIG. 20 illustrates specific calculation of a similarity value of "0.750" for fourth and fifth results which were previously determined to be similar;

FIG. 21 illustrates a similarity matrix populated based on calculations in accordance with FIG. 18;

FIG. 22 illustrates calculation of a similarity value utilizing an age field in addition to first name, last name, middle initial, and gender fields;

FIG. 23 illustrates calculation of a similarity value utilizing an age field in addition to first name, last name, middle initial fields, following discarding of a gender field;

FIG. 24 illustrates an interface with display of a gender value omitted in accordance with discarding of a gender field;

FIGS. 26-27 illustrate calculation of similarity values utilizing a title field in addition to first name, last name, and middle initial fields;

FIG. 28 illustrates a similarity matrix populated based on calculations in accordance with FIGS. 26-27;

FIG. 29 illustrates specific calculation of a similarity value of "0.600" utilizing an age field in addition to first name, last name, middle initial, and title fields;

FIG. 30 illustrates, for implementations in which a title field was not discarded for fourth and fifth results, specific calculation of a similarity value of "0.600";

FIG. 31 illustrates a display in accordance with FIG. 30;

FIG. 32 illustrates, for implementations in which a title field was discarded, specific calculation of a similarity value of "0.500";

FIG. 33 illustrates an exemplary formula for calculating a value indicating a difference between values of the same field of different results;

FIG. 34 illustrates how the exemplary formula of FIG. 33 can be utilized to determine a similarity value for an age field for different results;

FIGS. 35 and 36 illustrate specific calculation of similarity values utilizing an age field in addition to first name, last name, and middle initial fields;

FIG. 37 illustrates a similarity matrix populated based on calculations in accordance with FIGS. 35-36;

FIG. 38 illustrates an implementation in which default fields have been configured to include an age field, and in which each field that might be utilized in a similarity value determination is weighted;

FIG. 39 illustrates an exemplary formula for calculating a weighted similarity value; and FIG. 40 illustrates specific calculation of a weighted similarity value utilizing a title field in addition to first name, last name, and middle initial fields.

DETAILED DESCRIPTION

Figure 1:
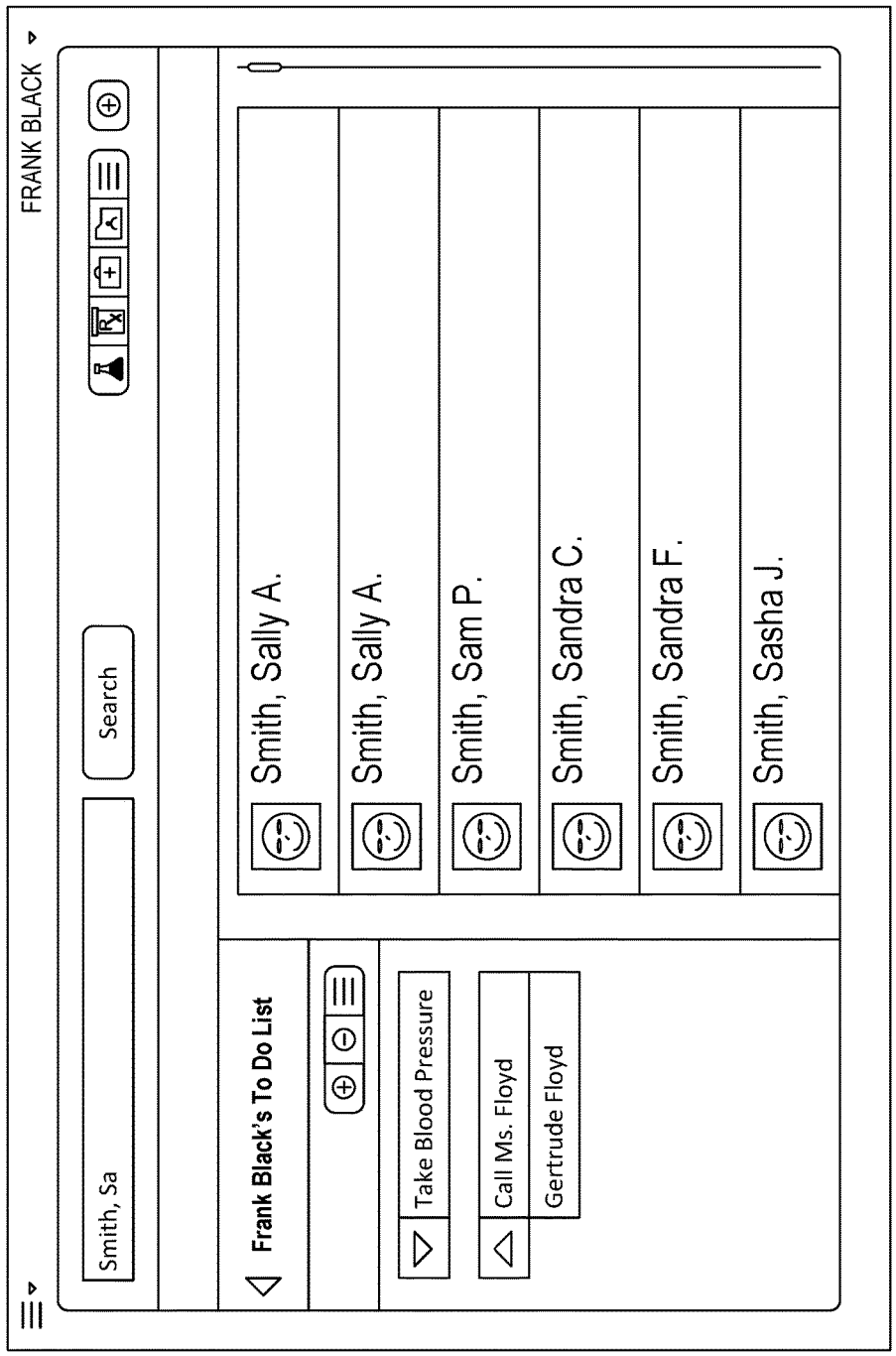
FIG. 1 illustrates an exemplary display of search results in response to a user, looking to search for "Sally Smith", inputting a search string of "Smith, Sa"

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features.

Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

Figure 2:
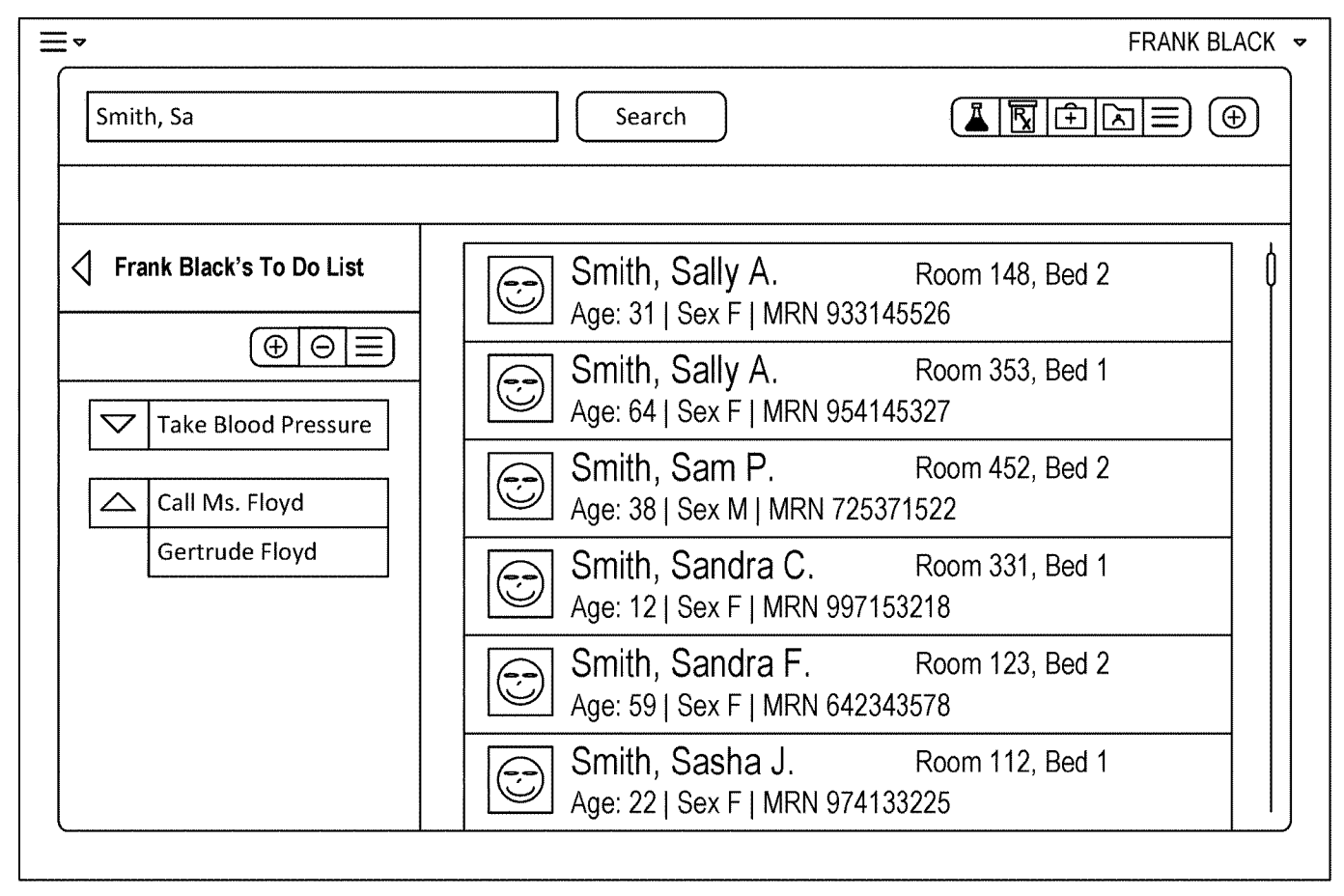

As noted above, in accordance with some conventional search methodologies, if a user is looking for data, such as data about a particular patient named Sally Smith, and a system contains data on multiple Sally Smiths, then displayed search results could be visually very similar and a user may not see enough distinguishing information across the search results in order to pick out the Sally Smith that they are interested in, as illustrated in FIG. 1. Although the system could be configured to display data corresponding to a large number of fields to guard against this, as illustrated in FIG. 2, this can in some instances create an unnecessarily cluttered interface, and make it harder for a user to quickly review search results.

In one or more preferred methodologies in accordance with one or more embodiments, a system dynamically adapts the data displayed for search results to facilitate review by a user. In one or more preferred implementations, such adaptation involves the display of more or fewer distinct data fields for each search result. In one or more preferred implementations, the system determines data fields to display to help a user distinguish search results, and displays data corresponding to those fields for all search results, while in other preferred implementations the data displayed for every search result is not necessarily the same. That is, in one or more preferred implementations, the system may display data corresponding to a first number of data fields for most entries, but display data corresponding to one or more additional data fields for entries that the system has determined might be confused by a user.

For example, FIG. 3A illustrates the display of search results in accordance with one or more preferred implementations, where the system has determined that there is a degree of similarity between the two patients named "Sally A. Smith", and so displays additional data corresponding to these patients. Similarly, the system has determined that there is similarity between the two patients named "Sandra Smith", and so displays additional data corresponding to these patients as well.

Figure 3B:
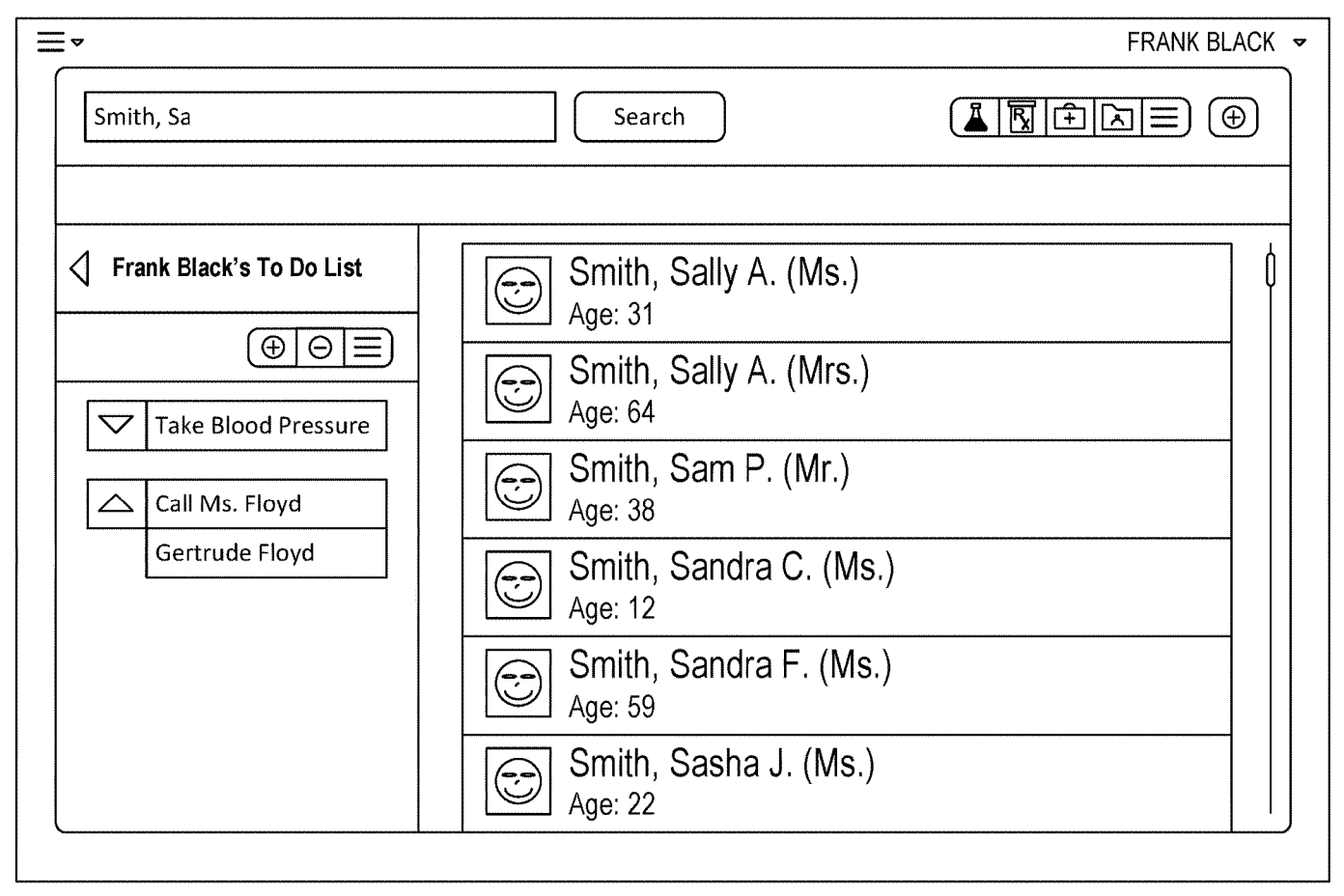

Notably, in this implementation, additional data is not displayed with respect to other patients displayed in the search results, although in at least some implementations, the same data fields may be displayed for all search results, as illustrated in FIG. 3B.

In an exemplary preferred methodology, a result set for a search is analyzed for similarity among items in the set to determine search results that a user might find confusing. In one or more preferred implementations, one or more similarity matrices are computed and utilized to dynamically adapt or modify the display of search results.

For example, with respect to strings, a simple string comparison algorithm might be utilized to determine similarity between two strings.

Returning to the example of FIG. 1, in an exemplary methodology, a system would calculate similarity values between search results based on the data to be displayed by default. For example, if the default is to only display data corresponding to a "First Name" field, a "Last Name" field, and a "Middle Initial" field, then a similarity value for two results might be computed by determining a similarity value for each field of the two results (e.g., comparing the "Last Name" value of the first result to the "Last Name" value of the second result), adding these similarity values together, and then dividing by the total of number of fields to be displayed by default (in this case, three). This exemplary methodology is illustrated in FIG. 4.

In accordance with this exemplary methodology, a similarity value would be calculated between first and second search results as illustrated in FIG. 5. In this manner, a similarity value would be calculated between each result of the results set. For example, FIG. 6 illustrates calculation of a similarity value corresponding to similarity between first and third search results, and FIG. 7 illustrates calculation of a similarity value corresponding to similarity between fourth and fifth search results.

The calculated similarity values can be utilized to populate a similarity matrix, as illustrated in FIG. 8A. In one or more preferred implementations, such a similarity matrix is first calculated for the display of default fields, and a determination is made as to whether additional fields over and above the default fields need to be displayed based on whether a similarity value between two search results (as represented in the similarity matrix) exceeds a certain threshold.

Returning to the example of FIG. 7, if the system had a threshold similarity value of "0.650", the system would determine, based on the similarity values in the similarity matrix, that additional fields need to be displayed for at least results one and two (based on the similarity value "1.000" corresponding to the first and second results exceeding the threshold value of "0.650"), and results four and five (based on the similarity value "0.666" corresponding to the fourth and fifth results exceeding the threshold similarity value of "0.650"). FIG. 8B highlights (via underlining) each of the similarity values in the similarity matrix of FIG. 8A which exceeds the threshold similarity value of "0.650".

The system will preferably adapt based on a model of what a human user might find more or less distinctive about certain results. For example, in one or more preferred implementations, one or more additional data fields, such as an age field, would be evaluated for possible display, and one or more new similarity values calculated based on possible inclusion of such fields. In some preferred implementations, all similarity values might be recalculated, while in other preferred implementations, only those similarity values for results determined to need further distinction might be calculated.

Figure 9:
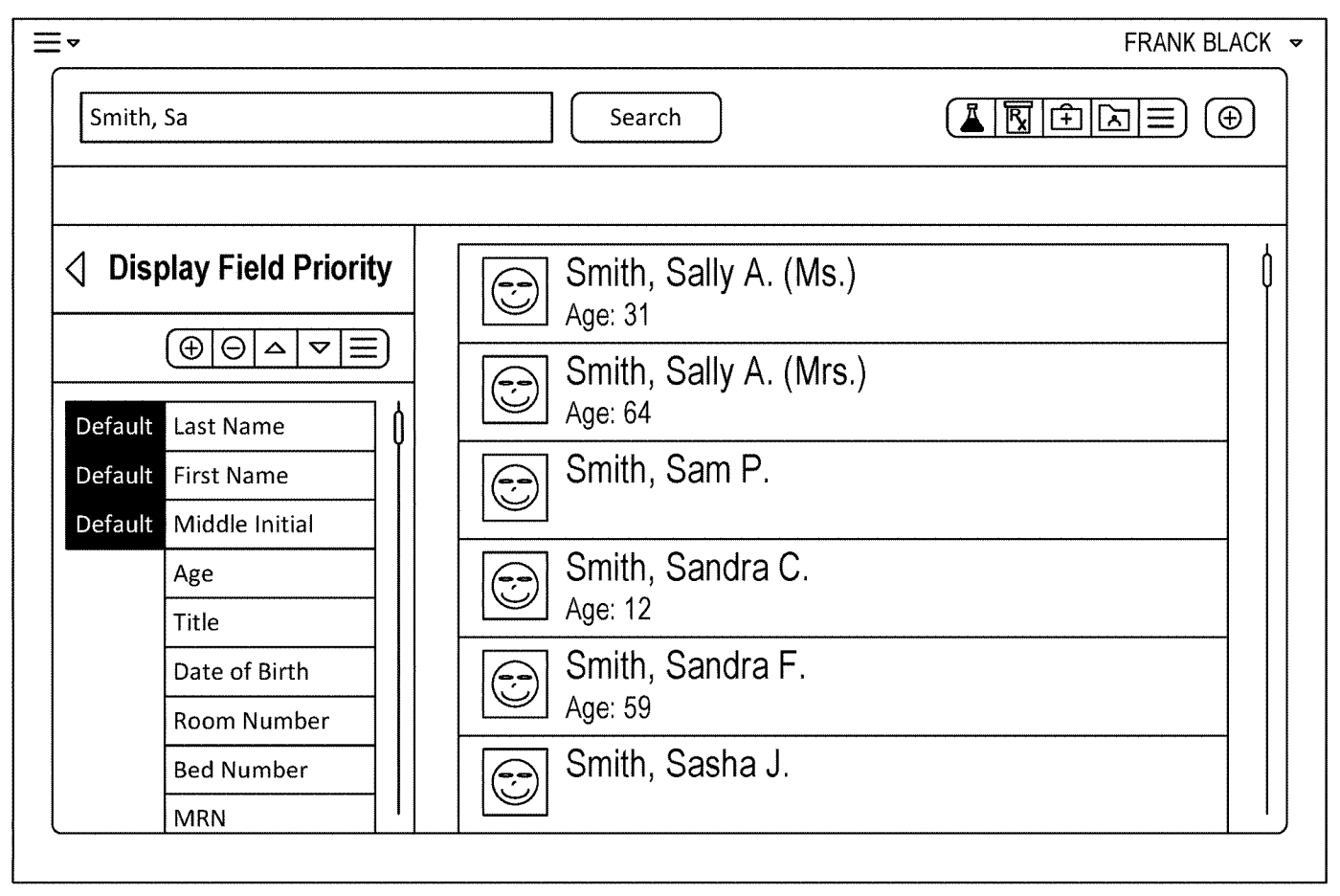

In one or more preferred implementations, the one or more additional fields to be evaluated for possible display are selected from a list in a predetermined, or user selected, order. FIG. 9 illustrates an exemplary user interface for allowing a user to modify such an order. In one or more preferred implementations, such a user interface may only be available as part of separate configuration application, or may only be available to administrative users.

In accordance with the order illustrated in FIG. 9, if the system determines that display of the default last name, first name, and middle initial fields is not sufficient to distinguish the results (e.g. the calculated similarity values do not exceed a threshold similarity value, which may also be predetermined or user configurable), then one or more new similarity values are calculated based on potential inclusion of one or more next fields in the order.

Based on the order illustrated in FIG. 9, the next field to be utilized is an age field. FIG. 10 illustrates calculation of a similarity value utilizing an age field in addition to first name, last name, and middle initial fields. FIG. 11 illustrates specific calculation of a similarity value of "0.750" using this methodology for the first and second results which were previously determined to be similar, and FIG. 12 illustrates specific calculation of a similarity value using this methodology for the fourth and fifth results which were previously determined to be similar.

FIG. 13A illustrates the resulting similarity matrix populated based on these calculations, and FIG. 13B illustrates the same similarity matrix with similarity values exceeding the threshold value of "0.650" highlighted (in this implementation, the same threshold similarity value is utilized for analysis of this second similarity matrix, but in at least some preferred implementations, a higher or lower threshold similarity value may be utilized).

The system would then once again make a determination as to whether additional fields over and above the contemplated display fields (in this example, updated as compared to the initial default display fields to include an age field) need to be displayed based on whether a similarity value between two search results (as represented in the similarity matrix) exceeds a certain threshold. As illustrated in FIG. 13B, the similarity value of "0.750" corresponding to the first and second results exceeds the threshold similarity value of "0.650", so one or more additional fields will need to be displayed, and the system will continue to iterate through the list of fields.

Based on the order illustrated in FIG. 9, the next field to be utilized is a title field. FIG. 14 illustrates calculation of a similarity value utilizing a title field in addition to first name, last name, middle initial, and age fields. FIG. 15 illustrates specific calculation of a similarity value of "0.600" using this methodology for the first and second results which were previously determined to be similar.

FIG. 16 illustrates the resulting similarity matrix populated based on these calculations. The system would then once again make a determination as to whether additional fields over and above the contemplated display fields (in this example, updated as compared to the previous calculation to include a title field) need to be displayed based on whether a similarity value between two search results (as represented in the similarity matrix) exceeds a certain threshold. As illustrated in FIG. 16, the similarity value of "0.600" corresponding to the first and second results falls below the threshold similarity value of "0.650", so no more additional fields will need to be displayed. Consequently, the search results are displayed as illustrated in FIG. 9.

Figure 17:
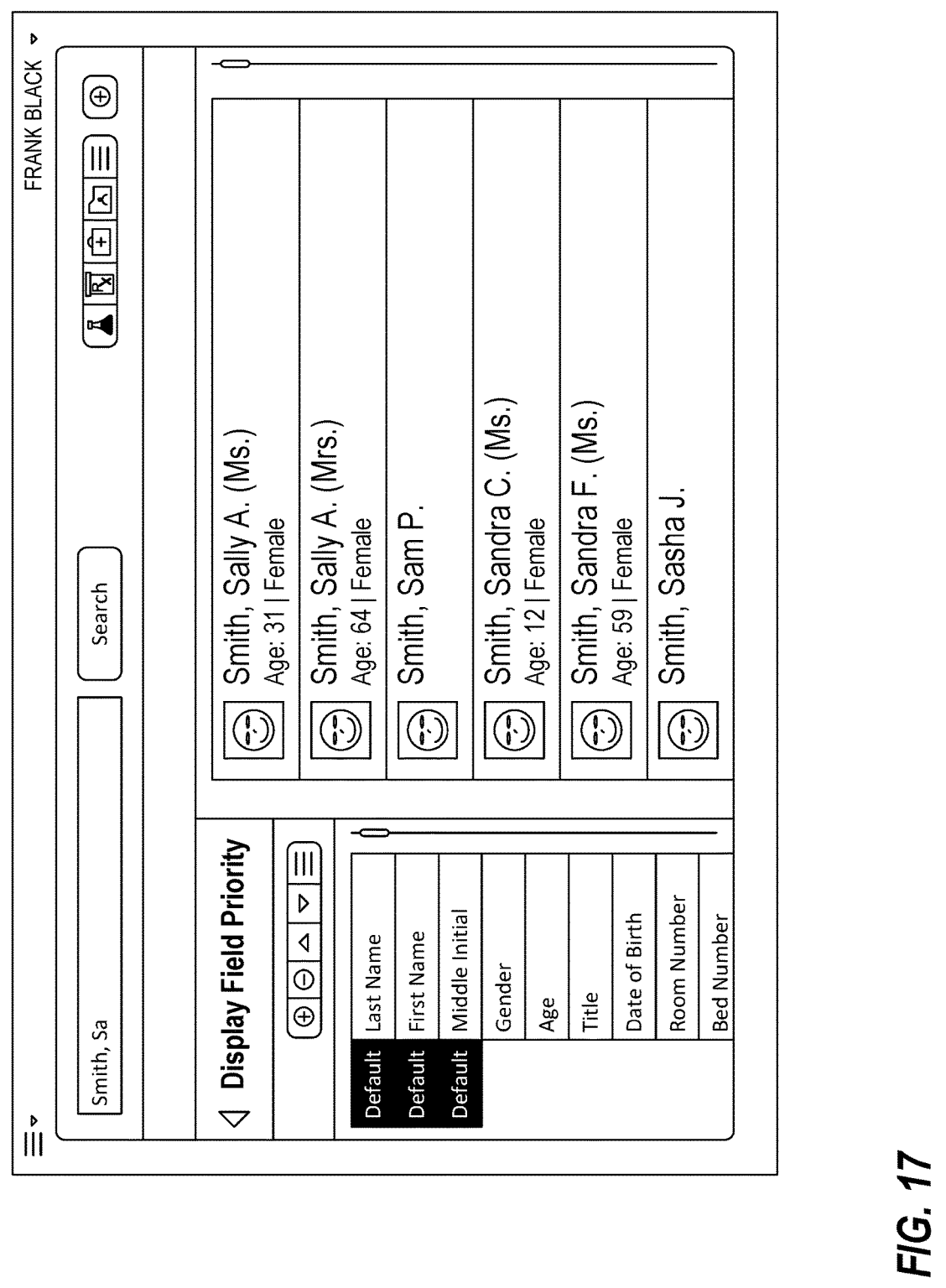

Notably, a user could alter the order of field priority for purposes of determining similarity. FIG. 17 illustrates a change in the order of field priority that places a gender field ahead of an age field. Returning to the similarity matrix of FIG. 8B, where the default fields are determined to be insufficient to distinguish between the first and second results and the fourth and fifth results, the next field in the order, now a gender field, would be evaluated for possible display, and one or more new similarity values calculated based on possible inclusion of such field.

FIG. 18 illustrates calculation of a similarity value utilizing a gender field in addition to first name, last name, and middle initial fields. FIG. 19 illustrates specific calculation of a similarity value of "1.000" using this methodology for the first and second results which were previously determined to be similar, and FIG. 20 illustrates specific calculation of a similarity value of "0.750" using this methodology for the fourth and fifth results which were previously determined to be similar.

FIG. 21 illustrates the resulting similarity matrix populated based on these calculations, with similarity values exceeding the threshold value of "0.650" highlighted.

The system would then once again make a determination as to whether additional fields over and above the contemplated display fields (in this example, updated as compared to the initial default display fields to include a gender field) need to be displayed based on whether a similarity value between two search results (as represented in the similarity matrix) exceeds a certain threshold. As illustrated in FIG. 21, both the similarity value of "1.000" corresponding to the first and second results and the similarity value of "0.750" corresponding to the fourth and fifth results exceeds the threshold similarity value of "0.650", so one or more additional fields will need to be displayed.

In one or more preferred implementations, the next field in the order, now an age field, would be evaluated for possible display, and one or more new similarity values calculated based on possible inclusion of such field. FIG. 22 illustrates calculation of a similarity value utilizing an age field in addition to first name, last name, middle initial, and gender fields.

Figure 24:
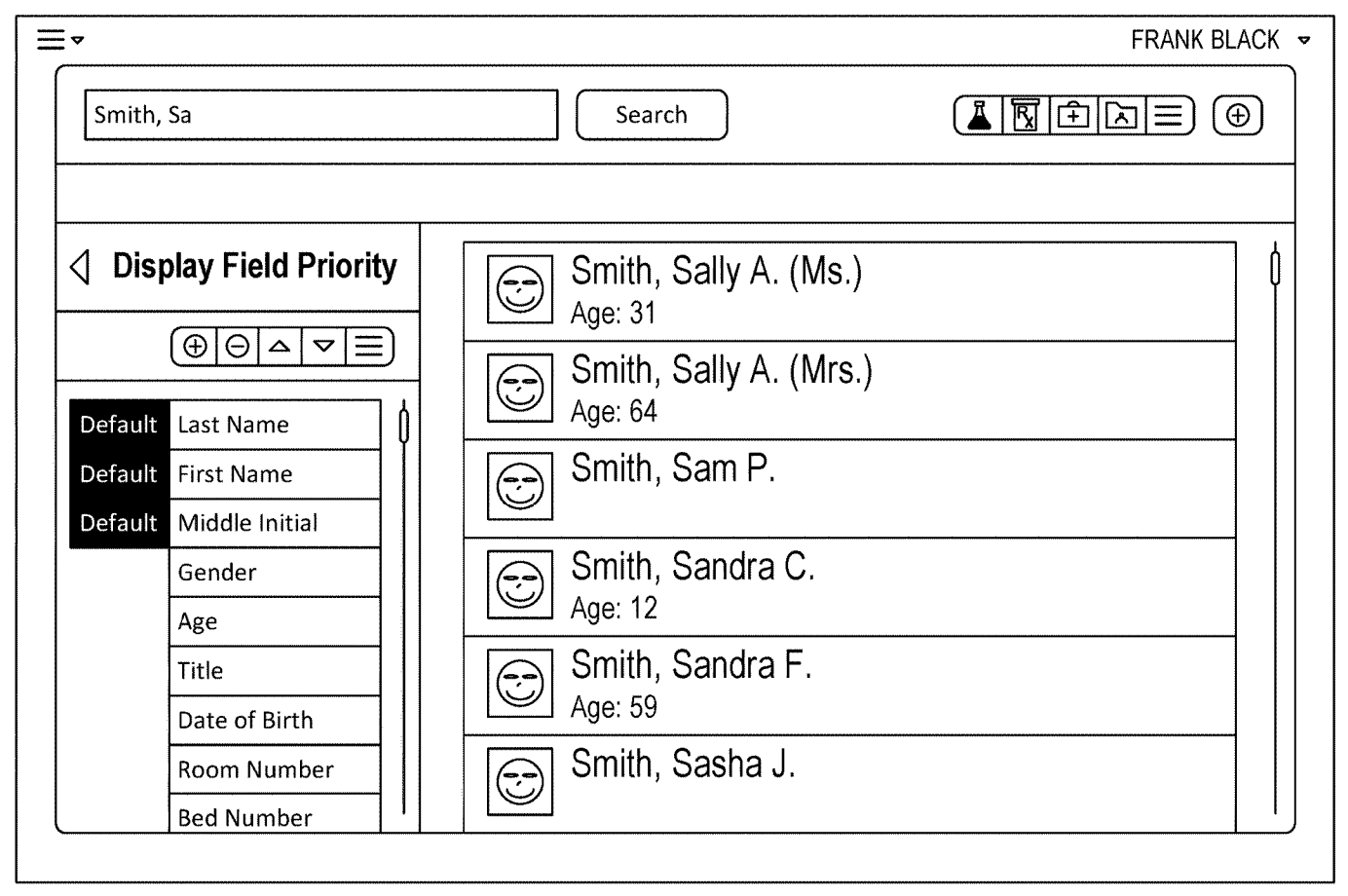

Notably, however, use of the gender field in such calculations, rather than decreasing the similarity value between each of these pairs, increased the similarity value between each of these pairs. In one or more preferred implementations, this would cause the gender field to be discarded, both for use in future calculations and for eventual display, and the system would move to the next field in the order, now an age field, evaluated that field for possible display, and calculate one or more new similarity values based on possible inclusion of such field. FIG. 23 illustrates calculation of a similarity value utilizing an age field in addition to first name, last name, middle initial fields, following discarding of a gender field. In such an implementation, rather than displaying a gender value as illustrated in FIG. 17, display of a gender value would be omitted as illustrated in FIG. 24.

Figure 25:
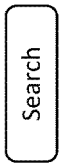
FIG. 25 illustrates changes in the order of field priority that place a title field ahead of an age field.

FIG. 25 illustrates additional changes in the order of field priority that place a title field ahead of an age field. Returning to the similarity matrix of FIG. 8B, where the default fields are determined to be insufficient to distinguish between the first and second results and the fourth and fifth results, the next field in the order, now a title field, would be evaluated for possible display, and one or more new similarity values calculated based on possible inclusion of such field.

FIGS. 26-27 illustrate calculation of similarity values utilizing a title field in addition to first name, last name, and middle initial fields. FIG. 26 illustrates specific calculation of a similarity value of "0.750" using this methodology for the first and second results which were previously determined to be similar, and FIG. 27 illustrates specific calculation of a similarity value of "0.750" using this methodology for the fourth and fifth results which were previously determined to be similar.

FIG. 28 illustrates the resulting similarity matrix populated based on these calculations, with similarity values exceeding the threshold value of "0.650" highlighted.

The system would then once again make a determination as to whether additional fields over and above the contemplated display fields (in this example, updated as compared to the initial default display fields to include a title field) need to be displayed based on whether a similarity value between two search results (as represented in the similarity matrix) exceeds a certain threshold. As illustrated in FIG. 28, both the similarity value of "0.750" corresponding to the first and second results and the similarity value of "0.750" corresponding to the fourth and fifth results exceeds the threshold similarity value of "0.650", so one or more additional fields will need to be displayed.

Although the inclusion of the title field decreased the similarity value for the first and second results, it increased the similarity value for the fourth and fifth results. In one or more preferred implementations, the title field would be discarded for the fourth and fifth results, as previously described with respect to the gender field, while in one or more other preferred implementations, the title field would nevertheless continue to be utilized for the fourth and fifth results.

In either event, the next field in the order, now an age field, would be evaluated for possible display, and one or more new similarity values calculated based on possible inclusion of such field.

Figure 31:
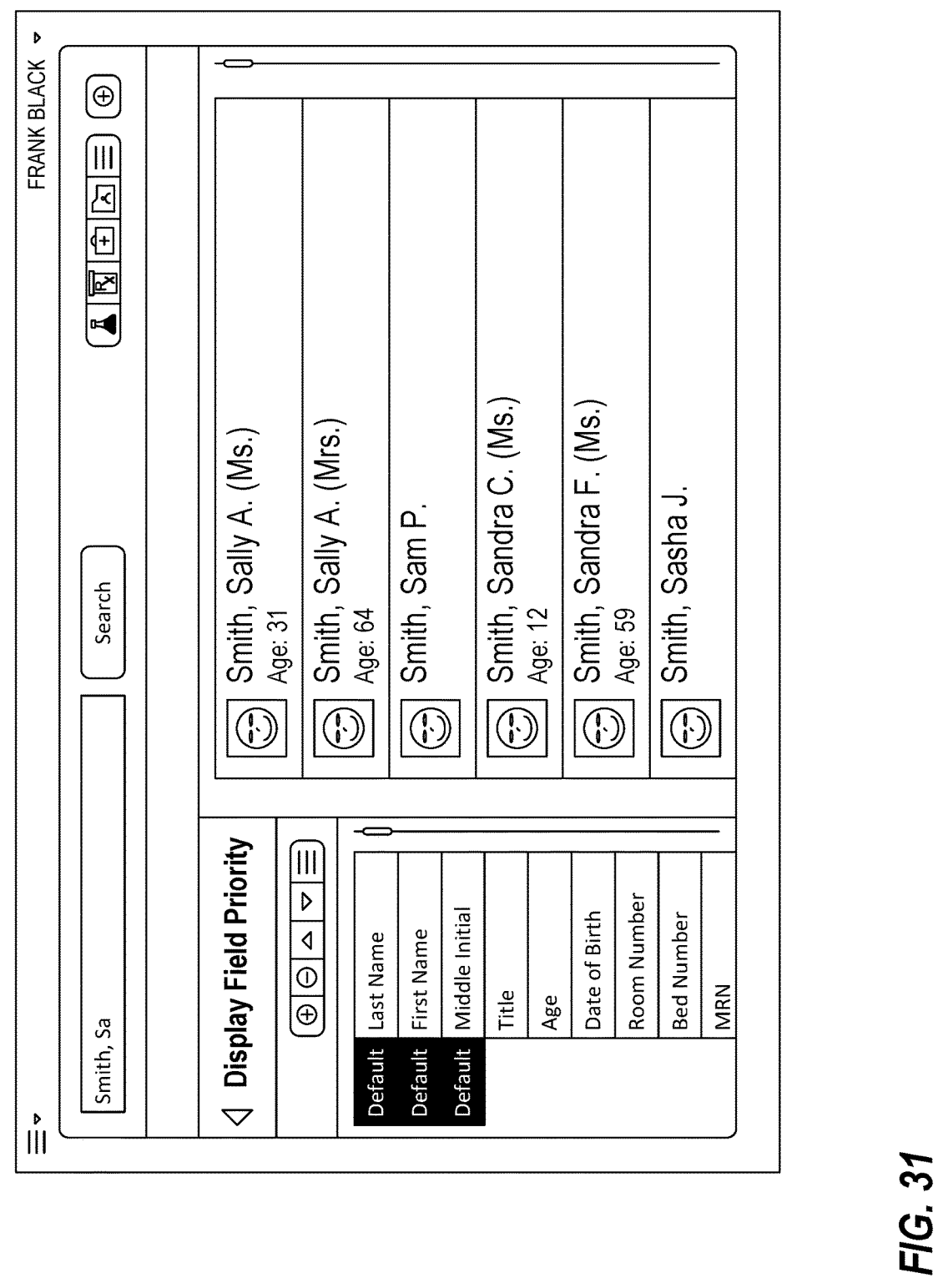

FIG. 29 illustrates specific calculation of a similarity value of "0.600" utilizing an age field in addition to first name, last name, middle initial, and title fields. FIG. 30 illustrates, for implementations in which the title field was not discarded for the fourth and fifth results, specific calculation of a similarity value of "0.600", resulting in display as seen in FIG. 31, while FIG. 32 illustrates, for implementations in which the title field was discarded, specific calculation of a similarity value of "0.500", resulting in a display as seen in FIG. 25.

Although similarity comparisons between the same field of different results have been illustrated thus far as being binary comparisons resulting in a "1" value indicating identical values, or a "0" value representing different values, in one or more preferred implementations, a calculated value at least partially indicates an extent of difference between values of the same field of different results.

Figure 33:
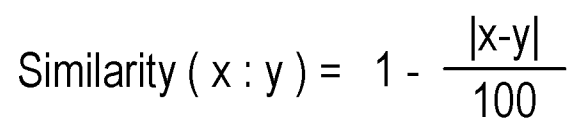

For example, FIG. 33 illustrates an exemplary formula for calculating such a value indicating a difference between values of the same field of different results. FIG. 34 illustrates how this formula can be utilized to determine a similarity value for an age field for different results.

Returning to the example of FIGS. 11 and 12, FIGS. 35 and 36 illustrate specific calculation of a similarity value utilizing an age field in addition to first name, last name, and middle initial fields.

FIG. 37 illustrates the resulting similarity matrix populated based on these calculations, with similarity values exceeding the threshold similarity value of "0.650" highlighted. Notably, whereas the similarity value for results four and five based on inclusion of the age field was deemed sufficiently dissimilar to not need display of additional information based on the value calculated when a binary age comparison was utilized, the similarity value calculated using a more gradient comparison value is not sufficiently dissimilar based on a threshold similarity value of "0.650".

Figure 38:
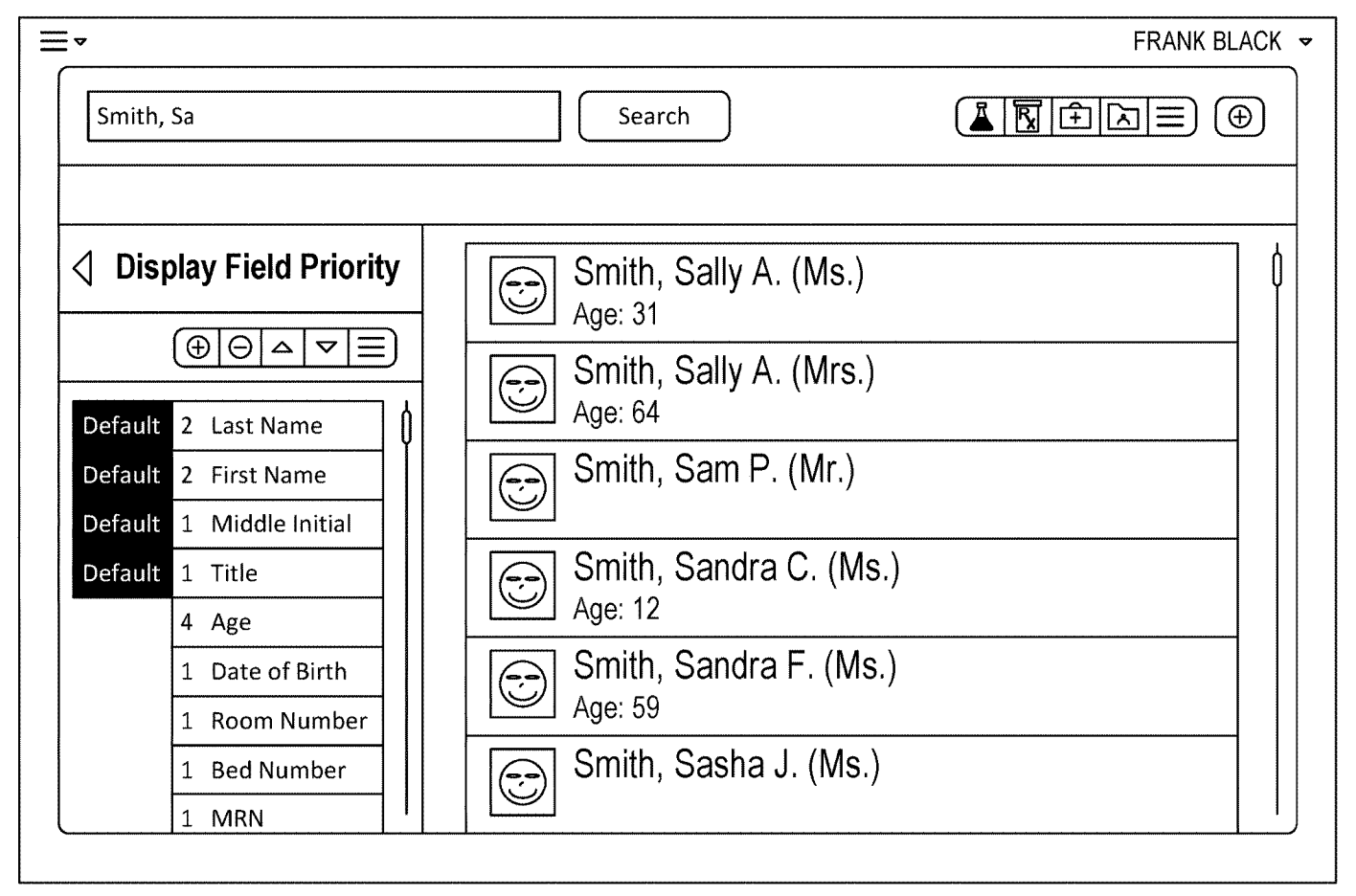

Notably, although the default fields for initial evaluation have been fixed as the first name, last name, and middle initial in the examples thus far provided, in one more preferred implementations different default fields may be configured, and in at least some preferred implementations, the default fields may be user configurable. FIG. 38 illustrates an implementation in which the default fields have been configured to include an age field.

Further, although similarity values have thus far been calculated assuming that all fields utilized in such comparison are weighted equally, in one or more preferred implementations, one or more fields are weighted comparatively. For example, FIG. 38 illustrates an implementation in which each field that might be utilized in a similarity value determination is weighted. With respect to the default fields, the last name and first name fields each have a weight of two, while the middle initial field has a weight of one, perhaps based on the fact that a user may not know a patient's middle initial, and so the information may not be as useful in distinguishing between two patients.

FIG. 39 illustrates an exemplary formula for calculating a weighted similarity value, and FIG. 40 illustrates specific calculation of a weighted similarity value utilizing a title field in addition to first name, last name, and middle initial fields.

In one or more preferred implementations, a system is configured to adapt displayed results based on a model of what the human interpreter would find more or less distinctive about certain results. When a result set is determined based on a user's search criteria, the system analyzes the set of results for similarity among items, e.g. utilizing a comparison matrix with similarity values that might be normalized to range from 0 to 1 for each possible pair of results. In one or more preferred implementations, if a similarity value is high enough, e.g. higher than a given threshold value, then the amount of data displayed for each of those two results is adjusted such that the two results are more distinguishable.

In one or more preferred implementations, a system would be configured to only adjust the amount of information displayed in response to a search result upward from the default display, while in at least some preferred implementations the system would also be configured to potentially reduce the amount of information displayed downward based on determined similarity values, e.g. to remove fields from display, which could reduce visual noise on displayed search results.

For example, in one more preferred implementations, a minimum similarity value threshold might be set whereby if a similarity value for two results falls below that minimum similarity value threshold, one or more fields may be removed from display for those two results.

Returning to the example of FIG. 3A where first name, last name, and middle initial fields are utilized by default, in one or more preferred implementations a default field, such as the middle initial field, might not be displayed for a particular result if the similarity value for that particular result and every other result falls below a minimum threshold similarity value and/or that default field is not needed to distinguish any other result.

In one or more preferred implementations, a system is configured to iteratively increase the number of fields displayed, for one or more results that are similar, or for all results, or for groupings that are similar, until a recalculated similarity for each result is sufficiently low, e.g. below a maximum threshold value. Additionally or alternatively, in one or more preferred implementations, a system is configured to iteratively decrease the number of fields displayed, for one or more results or for all results, until a recalculated similarity for such results is above a minimum threshold value. In one or more preferred implementations the order of fields to be considered, and the minimum and maximum threshold values, are user configurable.

Further, in one or more preferred implementations, a system is configured to intelligently select fields to consider next based on which fields are found similar or dissimilar. For example, if consideration of a title field has already been found to be similar between two results, a system might not spend time calculating whether a gender field would increase or decrease similarity.

In one or more preferred implementations, calculation of similarity between two field values for two different results is based on simple string comparison, or simple arithmetic comparison, or formulaic arithmetic comparison. In one or more preferred implementations, however, semantic comparison and/or natural language processing is utilized to determine similarity.

In one or more preferred implementations, one or more comparisons or related processing occurs at a local device, e.g. the device at which input is received from a user and/or the device at which results are displayed to a user, while in one or more preferred implementations some or all processing is carried out at one or more remote servers.

Although described herein in the context of implementations in which a similarity value lies on a scale between zero and one, it will be appreciated that other scales may be utilized. Further, although described herein where a one indicates high similarity, and a zero indicates low similarity, it will be appreciated that in some implementations a one may indicate low similarity, and a zero may indicate high similarity. It will be appreciated that, in such implementations, a similarity value may need to rise above a threshold value to indicate sufficiently low similarity. Further, in one or more preferred implementations, a scale may incorporate negative numbers.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:
1. A method comprising:
(a) receiving, via one or more input devices associated with an electronic device, input corresponding to a search string for a search query;
(b) retrieving, based on the search string for the search query, a plurality of search results;
(c) automatically determining, based on configuration settings, one or more default data fields to be displayed by default for each of the search results,
(d) automatically determining a respective set of data fields to display for each of the search results, such determining including
(i) automatically calculating, utilizing a first search result of the plurality of search results and a second search result of the plurality of search results, a first similarity value representing a likelihood of user confusion between the first search result and the second search result based on the display of the default data fields,
(ii) automatically calculating, utilizing the first search result of the plurality of search results and a third search result of the plurality of search results, a second similarity value representing a likelihood of user confusion between the first search result and the third search result based on the display of the default data fields,
  (iii) automatically calculating, utilizing the second search result of the plurality of search results and the third search result of the plurality of search results, a third similarity value representing a likelihood of user confusion between the second search result and the third search result based on the display of the default data fields,
  (iv) automatically determining that the determined first similarity value exceeds a similarity value threshold,
  (v) in response to determining that the determined first similarity value exceeds a similarity value threshold, determining one or more additional data fields to display for the first and second results to avoid user confusion by
    (A) looking up, based on configuration settings, a first next field to utilize in similarity value calculations,
    (B) automatically recalculating, utilizing the first search result of the plurality of search results and the second search result of the plurality of search results, a fourth similarity value representing a likelihood of user confusion between the first search result and the second search result based on the display of the default data fields and the first next field, and
    (C) automatically determining that the determined fourth similarity value exceeds the similarity value threshold;
    (D) looking up, based on configuration settings, a second next field to utilize in similarity value calculations,
    (E) automatically recalculating, utilizing the first search result of the plurality of search results and the second search result of the plurality of search results, a fifth similarity value representing a likelihood of user confusion between the first search result and the second search result based on the display of the default data fields and the second next field, and
    (F) automatically determining that the determined fifth similarity value does not exceed the similarity value threshold;
(e) displaying, via a display associated with the electronic device, the plurality of search results, each displayed search result displaying data for one or more data fields based on the determined respective set of data fields to display for that search result, including
  (i) displaying, for the first search result, data for the default data fields and data for the second next field, but not data for the first next field,
  (ii) displaying, for the second search result, data for the default data fields and data for the second next field, but not data for the first next field,
  (iii) displaying, for the third search result, data for the default data fields but not data for the second next field or first next field;
(f) wherein, with the exception of the default fields, each displayed search result does not include display of extraneous data corresponding to fields that were not necessary to cause a recalculated similarity value to fall below a threshold similarity value.

2. The method of claim 1, wherein the electronic device comprises a tablet.

3. The method of claim 1, wherein the electronic device comprises a phone.

4. The method of claim 1, wherein the electronic device comprises a laptop.

5. The method of claim 1, wherein the electronic device comprises a desktop computer.

6. The method of claim 1, wherein the one or more input devices comprise a mouse.

7. The method of claim 1, wherein the one or more input devices comprise a touchpad.

8. The method of claim 1, wherein the one or more input devices comprise a keyboard.

9. The method of claim 1, wherein the one or more input devices comprise a trackball.

10. The method of claim 1, wherein the one or more input devices comprise a camera.

11. The method of claim 1, wherein the one or more input devices comprise a touchscreen.

12. The method of claim 1, wherein the display comprises a touchscreen.

13. The method of claim 1, wherein the display comprises a monitor.

14. The method of claim 1, wherein the display comprises a keyboard.

15. One or more non-transitory computer readable media containing computer executable instructions for performing a method comprising:
  (a) receiving, via one or more input devices associated with an electronic device, input corresponding to a search string for a search query;
  (b) retrieving, based on the search string for the search query, a plurality of search results;
  (c) automatically determining, based on configuration settings, one or more default data fields to be displayed by default for each of the search results,
  (d) automatically determining a respective set of data fields to display for each of the search results, such determining including
    (i) automatically calculating, utilizing a first search result of the plurality of search results and a second search result of the plurality of search results, a first similarity value representing a likelihood of user confusion between the first search result and the second search result based on the display of the default data fields,
    (ii) automatically calculating, utilizing the first search result of the plurality of search results and a third search result of the plurality of search results, a second similarity value representing a likelihood of user confusion between the first search result and the third search result based on the display of the default data fields,
    (iii) automatically calculating, utilizing the second search result of the plurality of search results and the third search result of the plurality of search results, a third similarity value representing a likelihood of user confusion between the second search result and the third search result based on the display of the default data fields,
    (iv) automatically determining that the determined first similarity value exceeds a similarity value threshold,
    (v) in response to determining that the determined first similarity value exceeds a similarity value threshold, determining one or more additional data fields to display for the first and second results to avoid user confusion by (A) looking up, based on configuration settings, a first next field to utilize in similarity value calculations, (B) automatically recalculating, utilizing the first search result of the plurality of search results and the second search result of the plurality of search results, a fourth similarity value representing a likelihood of user confusion between the first search result and the second search result based on the display of the default data fields and the first next field, and (C) automatically determining that the determined fourth similarity value exceeds the similarity value threshold;

(D) looking up, based on configuration settings, a second next field to utilize in similarity value calculations, (E) automatically recalculating, utilizing the first search result of the plurality of search results and the second search result of the plurality of search results, a fifth similarity value representing a likelihood of user confusion between the first search result and the second search result based on the display of the default data fields and the second next field, and (F) automatically determining that the determined fifth similarity value does not exceed the similarity value threshold;

(e) displaying, via a display associated with the electronic device, the plurality of search results, each displayed search result displaying data for one or more data fields based on the determined respective set of data fields to display for that search result, including (i) displaying, for the first search result, data for the default data fields and data for the second next field, but not data for the first next field, (ii) displaying, for the second search result, data for the default data fields and data for the second next field, but not data for the first next field, (iii) displaying, for the third search result, data for the default data fields but not data for the second next field or first next field;

(f) wherein, with the exception of the default fields, each displayed search result does not include display of extraneous data corresponding to fields that were not necessary to cause a recalculated similarity value to fall below a threshold similarity value.

16. A system including an electronic device and software loaded thereon configured to perform a method comprising:

(a) receiving, via one or more input devices associated with the electronic device, input corresponding to a search string for a search query;

(b) retrieving, based on the search string for the search query, a plurality of search results;

(c) automatically determining, based on configuration settings, one or more default data fields to be displayed by default for each of the search results, (d) automatically determining a respective set of data fields to display for each of the search results, such determining including (i) automatically calculating, utilizing a first search result of the plurality of search results and a second search result of the plurality of search results, a first similarity value representing a likelihood of user confusion between the first search result and the second search result based on the display of the default data fields, (ii) automatically calculating, utilizing the first search result of the plurality of search results and a third search result of the plurality of search results, a second similarity value representing a likelihood of user confusion between the first search result and the third search result based on the display of the default data fields, (iii) automatically calculating, utilizing the second search result of the plurality of search results and the third search result of the plurality of search results, a third similarity value representing a likelihood of user confusion between the second search result and the third search result based on the display of the default data fields, (iv) automatically determining that the determined first similarity value exceeds a similarity value threshold, (v) in response to determining that the determined first similarity value exceeds a similarity value threshold, determining one or more additional data fields to display for the first and second results to avoid user confusion by (A) looking up, based on configuration settings, a first next field to utilize in similarity value calculations, (B) automatically recalculating, utilizing the first search result of the plurality of search results and the second search result of the plurality of search results, a fourth similarity value representing a likelihood of user confusion between the first search result and the second search result based on the display of the default data fields and the first next field, and (C) automatically determining that the determined fourth similarity value exceeds the similarity value threshold;

(D) looking up, based on configuration settings, a second next field to utilize in similarity value calculations, (E) automatically recalculating, utilizing the first search result of the plurality of search results and the second search result of the plurality of search results, a fifth similarity value representing a likelihood of user confusion between the first search result and the second search result based on the display of the default data fields and the second next field, and (F) automatically determining that the determined fifth similarity value does not exceed the similarity value threshold;

(e) displaying, via a display associated with the electronic device, the plurality of search results, each displayed search result displaying data for one or more data fields based on the determined respective set of data fields to display for that search result, including (i) displaying, for the first search result, data for the default data fields and data for the second next field, but not data for the first next field, (ii) displaying, for the second search result, data for the default data fields and data for the second next field, but not data for the first next field, (iii) displaying, for the third search result, data for the default data fields but not data for the second next field or first next field;

(f) wherein, with the exception of the default fields, each displayed search result does not include display of extraneous data corresponding to fields that were not necessary to cause a recalculated similarity value to fall below a threshold similarity value.

17. The method of claim 16, wherein the electronic device comprises a tablet.

18. The method of claim 16, wherein the electronic device comprises a phone.

19. The method of claim 16, wherein the electronic device comprises a laptop.

20. The method of claim 16, wherein the electronic device comprises a desktop computer.

* * * * *